(12) United States Patent
Tolba et al.

(10) Patent No.: US 8,862,888 B2
(45) Date of Patent: Oct. 14, 2014

(54) SYSTEMS AND METHODS FOR THREE-FACTOR AUTHENTICATION

(75) Inventors: Ahmed Saleh Mohamed Tolba, Riyadh (SA); Muhammad Khurram Khan, Riyadh (SA); Khaled Soliman Alghathbar, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 13/348,612

(22) Filed: Jan. 11, 2012

(65) Prior Publication Data
US 2013/0179692 A1 Jul. 11, 2013

(51) Int. Cl.
*H04L 9/32* (2006.01)
*H04L 29/06* (2006.01)
*H04L 9/08* (2006.01)
*G06F 21/31* (2013.01)
*G06F 21/32* (2013.01)

(52) U.S. Cl.
CPC .......... *H04L 63/0861* (2013.01); *H04L 9/3231* (2013.01); *H04L 63/0838* (2013.01); *G06F 21/31* (2013.01); *G06F 21/32* (2013.01); *H04L 9/0866* (2013.01)
USPC ........... 713/179; 713/176; 713/172; 713/183; 713/189; 726/4; 726/5; 726/6; 726/7; 235/380

(58) Field of Classification Search
CPC ............ H04L 63/0838; H04L 63/0861; H04L 9/0866; H04L 9/3231; H04L 2463/082; H04W 12/06; G06F 21/31; G06F 21/32
USPC ......... 713/179, 155, 171, 172, 176, 180, 181, 713/184, 189; 726/4, 5, 6, 7; 235/380
See application file for complete search history.

(56) References Cited

U.S. PATENT DOCUMENTS

| 2010/0263029 A1* | 10/2010 | Tohmo et al. | 726/6 |
| 2011/0265149 A1* | 10/2011 | Ganesan | 726/4 |
| 2013/0068837 A1* | 3/2013 | Dollard | 235/380 |

OTHER PUBLICATIONS

Aloul et al. "Two Factor Authentication Using Mobile Phones" (IEEE/ACS International Conference on Computer Systems and Applications, 2009, pp. 641-644).*

* cited by examiner

*Primary Examiner* — Amare F Tabor
*Assistant Examiner* — Noura Zoubair
(74) *Attorney, Agent, or Firm* — Hart IP Law & Strategies (57) ABSTRACT

In one aspect, systems and methods for three-factor authentication include receiving a user's identification and password transmitted from the user's mobile device, generating a One Time Password (OTP), encrypting the OTP, and encoding the encrypted OTP in a two-dimensional barcode. The two-dimensional barcode of the encrypted OTP is transmitted to a computing device of the user, and an image of the two-dimensional barcode of the encrypted OTP displayed on the user's computing device is captured using the user's mobile device. The two-dimensional barcode of the encrypted OTP is decoded using the user's mobile device to obtain the encrypted OTP. The encrypted OTP is decrypted using the user's mobile device and displayed. The OTP then is spoken by the user, and the user's voice and the OTP are recognized to authenticate the user.

20 Claims, 4 Drawing Sheets

Fig. 4

SYSTEMS AND METHODS FOR THREE-FACTOR AUTHENTICATION

BACKGROUND

Authentication is an important technique to support e-business applications, such as online banking, e-commerce, or the like, and to restrict access to secure websites, secure computer systems and/or secure installations. Traditional authentication techniques check a username and password supplied by a user attempting to access a site, carry on a transaction, or perform similar acts. Usernames and/or passwords have traditionally been checked as plain text. Therefore, such authentication techniques cannot resist dictionary attacks, eavesdropping (such as may be perpetrated by spyware, including key-loggers and the like), social engineering attacks, or even guessing very well.

An alternative existing authentication approach, graphical password or Image Based Authentication (IBA), has been viewed as being more user friendly in terms of memorability and recallability. The basic premise is that the human brain is more capable of storing graphical information than numbers or letters. In addition, IBA utilizes an easier and more user-friendly memorization strategy. However, IBA is susceptible to guessing and spyware attacks.

SUMMARY

The described systems and methods relate to three-factor authentication that in various aspects include receiving a user's identification and password, a first factor of authentication, which is considered as something the user knows. A One Time Password (OTP) then is generated and encrypted to provide an OTP encrypted by a shared key. The encrypted OTP is encoded in a two-dimensional barcode to provide a two-dimensional barcode of the encrypted OTP. The two-dimensional barcode of the encrypted OTP is transmitted to a computing device of the user, and an image of the two-dimensional barcode of the encrypted OTP displayed on the user's computing device is captured using the user's mobile device. The two-dimensional barcode of the encrypted OTP is decoded using the user's mobile device to obtain the encrypted OTP, the encrypted OTP is decrypted by a shared key using the user's mobile device and displayed. If the decryption process is successful, the user's mobile device has the correct key. This is considered a second factor of authentication, which is something the user has. The user then speaks the OTP, and the user's voice and the OTP are recognized to authenticate the user. This is considered a third factor of authentication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

In one aspect, the systems and methods described herein relate to three-factor, One Time Password (OTP)-based authentication that enables mobile phone-based authentication for services provided on the Internet. Embodiments of the present systems and methods strongly authenticate users using their mobile phones and PC microphones in a user-friendly manner. This multi-factored authentication scheme is based on an encrypted OTP encoded in an image of a two-dimensional barcode and also on biometrics (i.e., speech/voice recognition). This encoded password is called an "OTP" because it is useable only once. Three factors of authentication are used to authenticate a user including: obtaining a login and password from a client side; matching decoded OTPs between a client side and server side; and utilizing biometrics, such as voice recognition, to authenticate on the server side. Encryption/decryption may be used to further secure transmission.

In accordance with various implementations of the present systems and methods, a user may easily authenticate him or herself using his or her mobile phone by first entering his or her user name or ID for the site he or she wishes to access, along with his or her normal password for the site. A user may have software on his or her mobile phone, which may allow the user to enter identification ("ID") and a password ("PW"), as well as to foster secure communication with a server to complete the authentication.

A barcode scanner function on a computing device such as a mobile phone can be used to scan a two-dimensional barcode image sent from the site to the user's computer. This two-dimensional barcode may embody an encrypted OTP. A two-dimension bar code is a black-and-white graphic that follows certain regulations and is used to store digital information. Compared to traditional, so-called one-dimensional bar codes, the two-dimensional bar code is designed to carry more data. Applying a two-dimensional bar code in the authentication process enables improvement in security. In various implementations, the two-dimensional barcode may be captured by a camera (e.g., the mobile phone's camera) and subsequently decoded and decrypted (e.g., by the phone). Further, the encryption/decryption may employ a shared-key based on the International Mobile Equipment Identity ("IMEI") of the phone and/or the International Mobile Subscriber Identity ("IMSI") of the user, which is "known" by the mobile phone and the site the user is attempting to access. A server may identify a user's mobile device through the mobile device's IMEI and/or the user's IMSI. The IMEI and/or IMSI may be extracted using the application-programming interface (API) for the mobile device's operating system. The present systems and methods may also employ a hash function, which may be based on this IMEI and/or IMSI to produce the encrypted OTP. Due to the one-way property of cryptographic hash functions, it is infeasible for an eavesdropper to reverse the hash function and obtain an earlier piece of the hash chain. Further, if the process of decryption cannot process the barcode/password due to the wrong key, the mobile phone attempting to process the barcode/password does not have the required IMEI and/or IMSI, and hence is not the user's.

Biometrics are automated methods that recognize people based on their physical and action characteristics. Such biometrics may be voice recognition (variously referred to as voice authentication or speaker recognition), fingerprint recognition, or the like. Voice recognition processes automatically recognize who is speaking, based on individual information included in speech waves. Voice recognition uses the acoustic features of speech that have been found to differ between individuals. In accordance with various implementations of the present systems and methods, upon decryption of the OTP and its display by the user's mobile device, the user reads the OTP into the microphone of his computer. The server of the site being accessed receives this spoken OTP (one time password). The password is authenticated and voice recognition is used to further authenticate the user to access the site.

Accordingly, the present systems and methods for authentication utilize three factors that can be characterized as something the user knows, user ID and password; something the user has, the user's mobile phone; and something the user is, his or her voiceprint, fingerprint, or the like.

The benefits of the present systems and methods may be applied in e-commerce channels, providing interactive, secure, and strong authentication of users. Importantly, the present systems and methods may be a benefit to a wide variety of organizations/businesses which require authentication (i.e., online banking, healthcare, online shopping, operating system login, etc.) whereby users will not be required to remember different passwords or carry tokens for authentication.

Particular examples discussed herein employ a user mobile device, which may be a wireless telephone, or other connected device, such as a Wi-Fi-enabled device, and employ a separate user-computing device, such as a PC. However, the present systems and methods can utilize any combination of devices, or a single device, such as the user's mobile device, alone. Further or alternatively, the user mobile device may be a dedicated authentication device, only enabled to carry out functions such as described herein.

An Exemplary System for Three-factor Authentication

Figure 1:
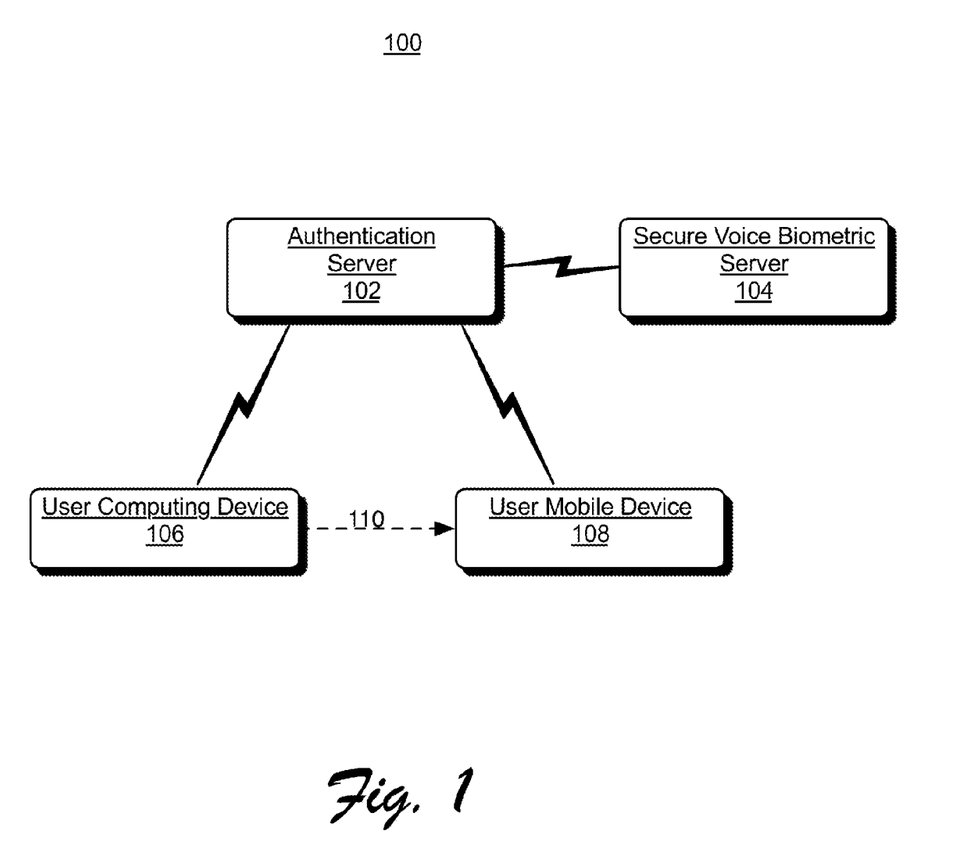
FIG. 1 is a block diagram showing an exemplary system for three-factor authentication, according to one embodiment.

FIG. 1 is a block diagram showing exemplary system 100 for three-factor authentication, according to one embodiment. System 100 is an environment capable of implementing the systems and methods for three-factor authentication described herein. System 100 includes, on the server side, an application server, such as illustrated authentication server 102 and Secure Voice Biometric Server (SBVS) 104 in data communication with one another. System 100 only shows a single authentication server 102 and a single separate SBVS 104. However, in accordance with any number of implementations of the present systems and methods, one or more computing devices may act as authentication server 102, and one or more computing devices may act as SBVS 104. Alternatively, the functions of authentication server 102 and SBVS 104, such as described below, may be centralized into a single server. System 100 also features a client, which may be user-computing device 106, and/or system 100 also incorporates user mobile device 108. Each of user computing device 106 and/or user mobile device 108 are also in data communication with authentication server 102. User mobile device 108 is capable of capturing an image (110) from a display of user computing device 106.

Authentication server 102 is responsible for generating the encrypted OTP encoded into a two-dimensional bar code image as a challenge to the user. To that end, authentication server 102 might include one or more server computing devices, each comprising one or more respective processors operatively coupled to respective memory, each memory comprising computer program instructions executable by a processor to implement operations. Such operations might include receiving a username and password such as transmitted from user computing device 106 or user mobile device 108, generation of the OTP and encrypting it, encoding the OTP in a two-dimensional barcode, and transmitting the two dimensional barcode of the encrypted OTP to user computing device 106. The operations carried out by the authentication server may also include receiving a transmission that includes the OTP, as spoken by the user, for recognition of the OTP to authenticate the user, and for passing along to SBVS 104 for voice recognition processing to compete authentication of the user. SBVS 104 may be a secure server that could be located away from authentication server 102 as a third party service. In accordance with various implementations of the present systems and methods, SBVS 104 generates, trains, and updates the user's unique set of speech models (the user's voiceprint), stores the speech model securely in a database, and performs the matching process to authenticate a user.

The client, i.e., user computing device 106, could be any computer with an Internet connection or other data link via which the user can access an Internet-based service or other data service. In accordance with various implementations, user-computing device 106 comprises one or more processors operatively coupled to memory comprising computer program instructions executable by the one or more processors to implement operations. Such operations include initiating contact with authentication server 102, such as supplying a username and password to authentication server 102. User computing device 106 also receives a two-dimensional barcode of the encrypted OTP, displays the two-dimensional barcode of the encrypted OTP for reading by user mobile device 108, records the OTP spoken by the user, and transmits the OTP to authentication server 102.

As noted, user mobile device 108 is incorporated into the present systems for three-factor authentication. User mobile device 108 may include one or more processors operatively coupled to memory comprising computer program instructions executable by the one or more processors to implement operations, such as initiating contact with authentication server 102 and supplying a username and password to authentication server 102. User mobile device 108 may, in accordance with various implementations, read the two-dimensional barcode displayed by user computing device 106, decrypt the encrypted OTP encoded in the two-dimensional bar code, and display the OTP on the user's mobile computing device for the user to read into the microphone of user computing device 106.

An Exemplary Procedure for Three-factor Authentication

Figure 2:
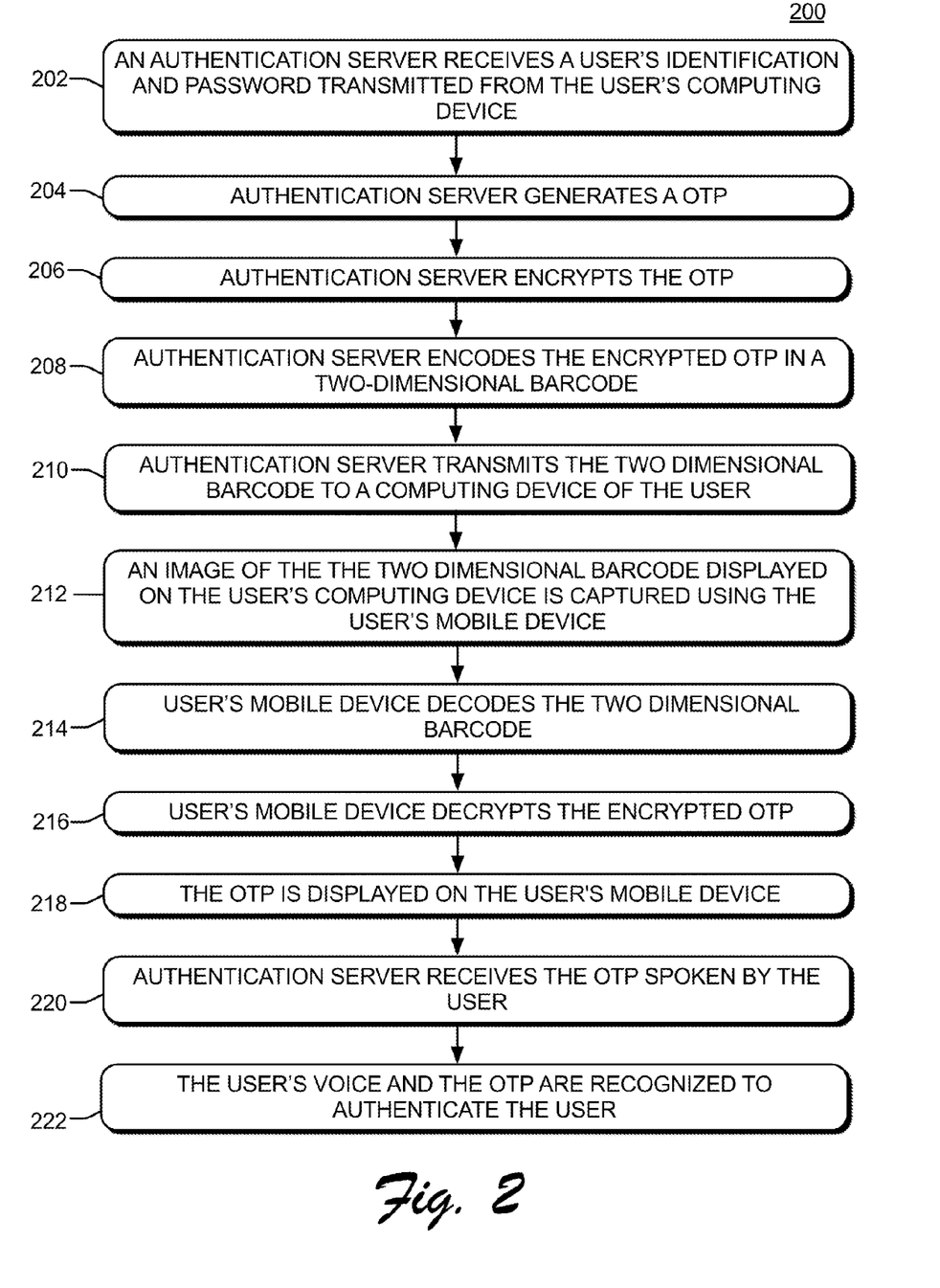
FIG. 2 is a flowchart showing an exemplary procedure for three-factor authentication, according to one embodiment.

FIG. 2 is a flowchart showing exemplary procedure 200 for three-factor authentication, according to one embodiment. In this example, a user's identification, such as a username or other "ID," and the user's password for the site being accessed is transmitted at 202, such as from the user's computing device (e.g., user computing device 106 of FIG. 1, for example, the user's PC), and is received by a server associated with the site, (e.g., authentication server 102 of system 100 shown in FIG. 1). At 204, an OTP is generated for the user. The OTP is encrypted at 206 and at 208, the server encodes a two-dimensional barcode reflecting the encrypted OTP. As discussed in greater detail below with respect to FIG. 3 and procedure 300, encryption at 206 may use a hash based on an IMEI of a mobile device of the user and/or the user's IMSI.

Additionally or alternatively, encryption at 206 may use a hash based on a number of times an OTP has been issued to the user. The IMEI, IMSI and/or the number of times an OTP has been issued to the user are known by the user's mobile device (e.g., user mobile device 108 of FIG. 1) and can be used to decrypt the OTP.

At 210, the encrypted two-dimensional barcode embodying the OTP is transmitted by the site authentication server to the computing device of the user. An image of the two-dimensional barcode displayed, such as on the user's computing device, is captured at 212 using the user's mobile device. In one implementation, for example, this is accomplished by photographing the image of the two-dimensional barcode using a camera of the user's mobile device. At 214, the two-dimensional barcode of the encrypted OTP is decoded, and the resulting encrypted string is decrypted using the user's mobile device at 216. At 218, the OTP is displayed, such as on a screen of the user's mobile device, in plain text. The user reads the OTP aloud at 220, such as into a microphone of the user's computing device, whereupon it may be recorded by the user's computing device and transmitted to an authentication server associated with the site being accessed.

The spoken OTP transmitted by the user's computing device is received at 222, such by the server associated with the site being accessed. At 224, the server, or an associated, dedicated voice recognition server, recognizes the user's voice and the OTP to authenticate the user to access the site using the user's computing device and/or the user's mobile device. This recognition of the user's voice at 224 may employ any number of biometric voice recognition techniques. For example, feature extraction is the processing of the raw speech data resulting in representative voice features, which contain information of the physiological characteristics of the user. In feature extraction, certain attributes of speech needed by the voice biometric system to differentiate people by their voice may be measured. Such techniques may employ mel-frequency cepstral coefficients. The extracted features may be compared with an archived voiceprint of the claimed user, which was created during the registration of the client, and a matching score may be calculated to provide verification. If the matching score is over a predefined threshold value, then the authorization is considered successful; otherwise, the user is not verified at 224.

An Exemplary Procedure for Generation and Encryption of an OTP

Figure 3:
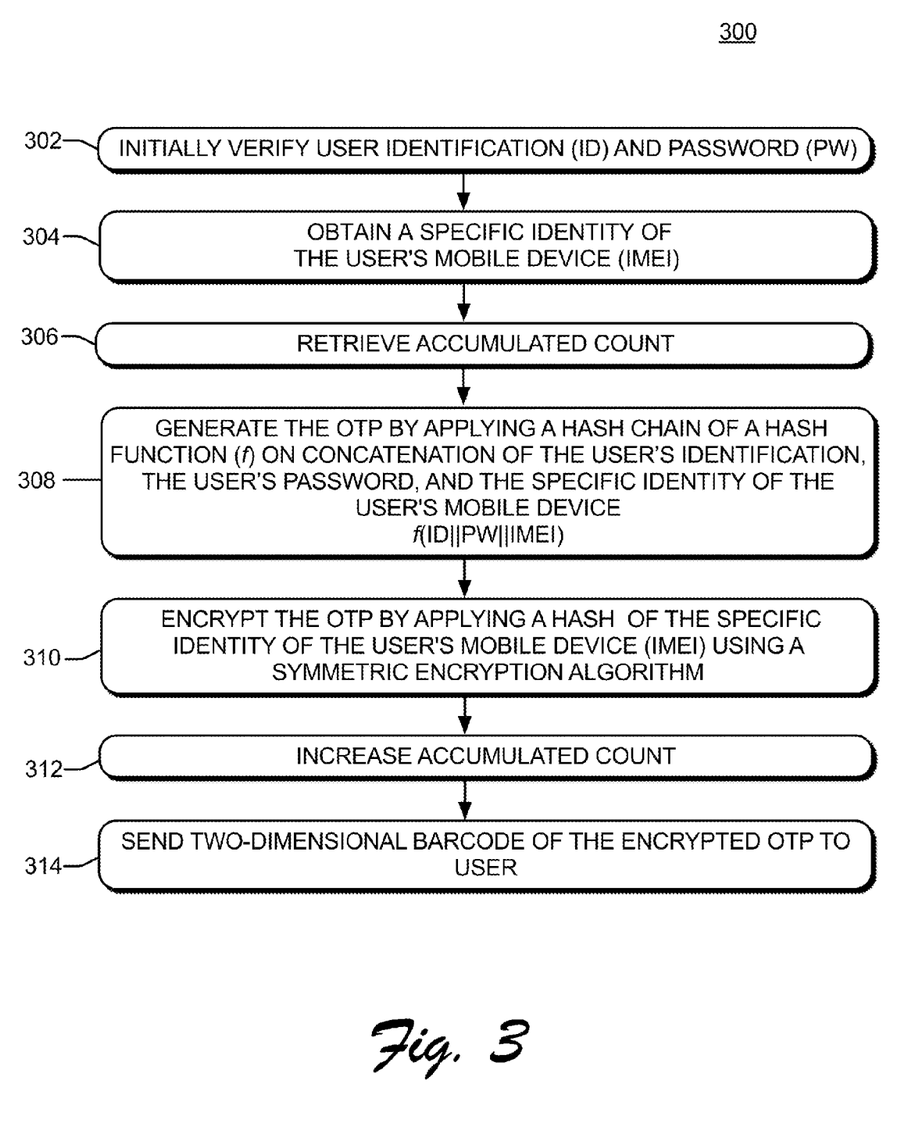
FIG. 3 is a flowchart showing an exemplary procedure for generation and encryption of an OTP for transmission to a user, according to one embodiment.

FIG. 3 is a flowchart showing exemplary procedure 300 for generation and encryption of an OTP for transmission to a user, according to one embodiment. Procedure 300 may be used in the course of implementing one or more of steps 202, 204, 206, and/or 208, but particularly step 206 of procedure 200 described above, according to one embodiment. For example, as touched upon above, encrypted OTP generation at 206 may use a hash chain, which is a successive application of a cryptographic hash function, H(X) to a string. For example, H(H(H(H(x)))) gives a hash chain of four in length. The server, which is providing authentication, may store a hash chain of a string. Thus, in accordance with the present systems and methods, a series of OTPs can be generated using cryptographic functions such as the MD5 message digest algorithm, a Secure Hash Algorithm (SHA), or the like, to generate the series of OTPs. Due to the one-way property of cryptographic hash functions, it is generally infeasible for an eavesdropper to reverse the hash function and obtain an earlier piece of the hash chain.

Turning to FIG. 3 and process 300, to generate an encrypted OTP in accordance with one implementation, the user's ID or username and password, such as received at 202 (in reference to FIG. 2), are initially verified at 302. For purposes of this example, suppose a username of "ID" and a password for the user of "PW." A specific identity of the mobile equipment is obtained at 304. As noted, various implementations of the present systems and methods employ the user device's IMEI and/or the user's IMSI for encryption of the OTP. The IMEI and/or IMSI may be extracted using the Application Programming Interface (API) for the mobile device's operating system and may be supplied to the server, such as at a time the user registers with the website and selects his username and password. In this example, the specific identity of the mobile equipment obtained at 304 is the IMEI, which is considered unique to the associated mobile device. At 306, an accumulated counter for how many times the user has visited the website, accessed the server being accessed, or the number of times an encrypted OTP has been issued to the user may be retrieved, such as from the server being accessed.

For purposes of this example, suppose "$f$" as the hash function used, which may, in accordance with the present systems and methods, be MD5, MD4, SHA-1, SHA-2 etc. In accordance with the present example, an OTP string is generated at 308 (i.e., in accordance with step 204 above). In process 300, generation of the OTP uses a hash function $f$ and concatenation of the username, the user password, and the user device IMEI. For example, $f(ID\|PW\|IMEI)$ may be used for generating an OTP by applying a hash chain on the function $f(ID\|PW\|IMEI)$.

At 310, the OTP is encrypted (i.e., in accordance with step 206 above). In accordance with process 300, the OTP may be encrypted at 310 by applying a hash of the specific identity of the user's mobile device (e.g., the user's mobile Device's IMEI) using a symmetric encryption algorithm This encryption may use a known symmetric algorithm, such as AES 128 bit or 256 bit. In this manner, the specific identity of the user's mobile device acts as a shared key. This shared key may also include "salting," added to the key as another security layer. This salting can be any predetermined function or integer constant, such as, by way of example, the length of the IMEI and/or IMSI number. The hash function applied at 310, as mentioned above, may be cryptographic functions such as the MD5 message digest algorithm, Secure Hash Algorithm (SHA), or the like, applied to the shared key for more security.

The counter is increased at 312; and at 314, a two-dimensional barcode image of the encrypted OTP is sent to the user (e.g., in accordance with step 210 of FIG. 2 above).

Client software on the user's mobile device decodes the two-dimensional barcode image, such as in accordance with steps 212-218 of FIG. 2 above. The two-dimensional barcode of the encrypted OTP is decoded, and the resulting encrypted string is decrypted using the user's mobile device for display. This decryption process may be carried out by extracting the key, such as the specific identity of the user's mobile device (IMEI) and the salting, from the user's mobile device using the mobile device's API. This key then is applied with the appropriate hashing function, such as the aforementioned MD5 message digest algorithm or SHA-1, to employ a symmetric decryption algorithm code for decrypting the OTP string. Then the user can read the OTP aloud for transmission to and verification by the server.

As noted, the client side software can decrypt the decoded OTP image using the known IMEI parameter and then generate the OTP. Since the generated image has been encrypted by this parameter (e.g., MD5(IMEI+Salting)), it should be decrypted by the same parameter. If the decryption process is not successful due to mismatch of the shared key (e.g., MD5 (IMEI+Salting), one of two circumstances may exist. The user may not have the correct mobile phone, so an OTP will not be generated, and the system will not allow the unauthorized user to login; or the generated barcode is falsified, and the user has been protected from spoofing or a similar attack.

Counter data, such as retrieved at 306 and updated at 312, may be used as a synchronization parameter between the server side and the client side. Hence, in accordance with the present systems and methods, the number of OTPs that have been generated on the server side and the number of OTPs that have been decrypted on the client side may be tracked and compared.

An Exemplary Computing Device

Figure 4:
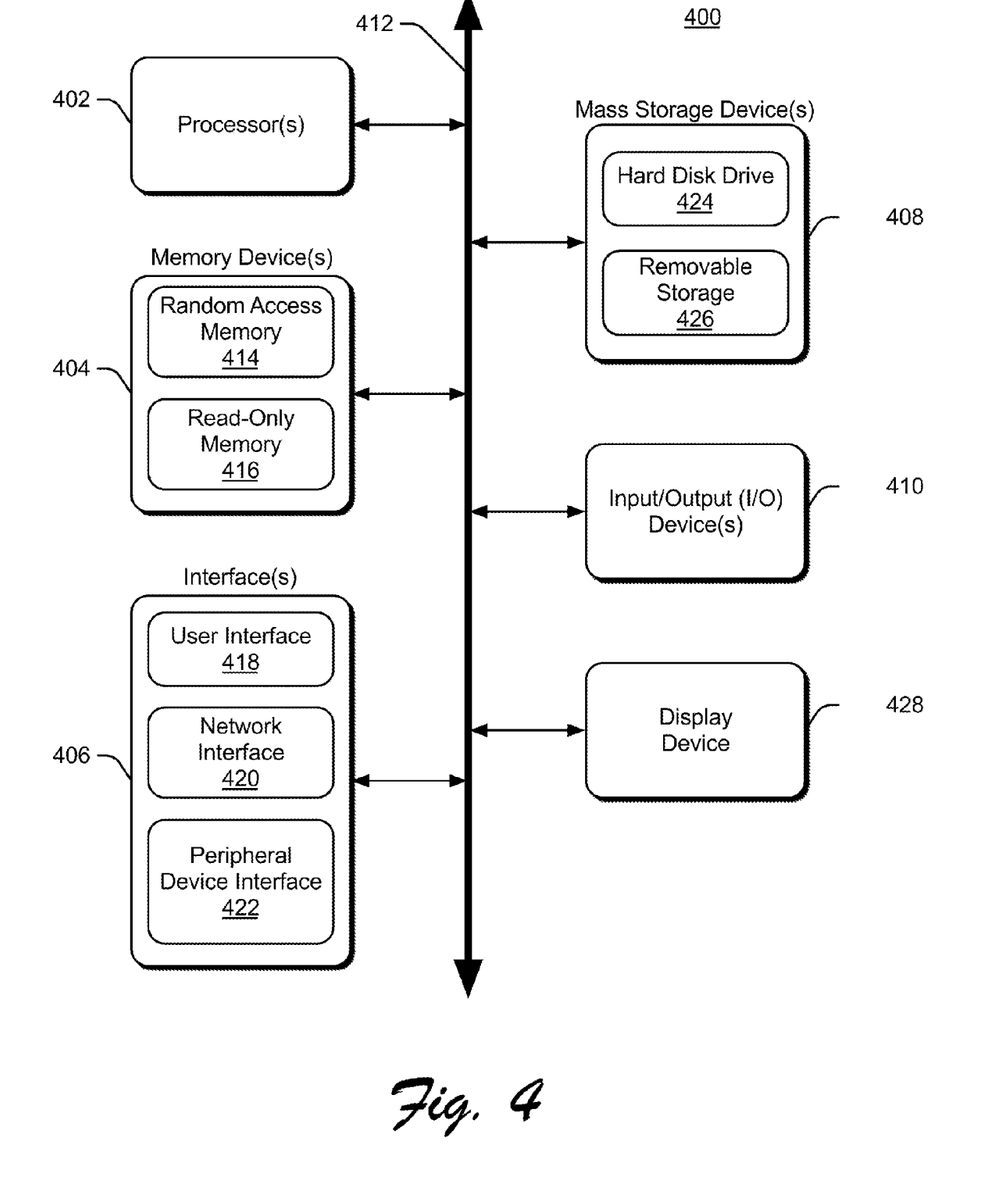
FIG. 4 is a block diagram illustrating an exemplary computing device on which various operations of three-factor authentication may be implemented, according to one embodiment.

FIG. 4 is a block diagram illustrating exemplary computing device 400 on which various operations of three-factor authentication may be implemented, according to one embodiment. Computing device 400 may be used to perform various procedures such as those discussed herein. Computing device 400 can function as a server, a client, a worker node, or any other computing entity. Computing device 400 can be any of a wide variety of computing devices, such as a desktop computer, a notebook computer, a server computer, a handheld computer, and the like.

Computing device 400 includes one or more processor(s) 402, one or more memory device(s) 404, one or more interface(s) 406, one or more mass storage device(s) 408, one or more Input/Output (I/O) device(s) 410, and a display device 428, all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM)) 414 and/or nonvolatile memory (e.g., read-only memory (ROM)) 416. Memory device(s) 404 may also include rewritable ROM, such as Flash memory.

Mass storage device(s) 408 include various computer readable media, such as magnetic tapes, magnetic disks, optical disks, solid state memory (e.g., Flash memory), and so forth. As shown in FIG. 4, a particular exemplary mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 428 is optionally directly coupled to the computing device 400. If display device 428 is not coupled to device 400, such a device is operatively coupled to another device that is operatively coupled to device 400 and accessible by a user of the results of method 100. Display device 428 includes any type of device capable of displaying information to one or more users of computing device 400. Examples of display device 428 include a monitor, display terminal, video projection device, and the like.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet. Other interfaces include user interface 418 and peripheral device interface 422.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400 and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

CONCLUSION

Although systems and methods for three-factor authentication have been described in language specific to structural features and/or methodological operations or actions, it is understood that the implementations defined in the appended claims are not necessarily limited to the specific features or actions described. Rather, the specific features and operations of three-factor authentication are disclosed as exemplary forms of implementing the claimed subject matter. For example, the present systems and methods for three-factor authentication are generally described above with respect to authentication for access to a website or other data site. However, the present systems and methods may be employed for authentication to access to a physical site, such as by incorporating the functions carried out by the servers and the user-computing device into a security system of such a facility. The user may use his or her mobile device to present identification information to the security system and/or at least to scan, decode, and decrypt a two-dimensional barcode of an encrypted OTP displayed by the security system. The user then may read the OTP aloud to the security system for recognition of the OTP and the user's voice, in accordance with the present systems and methods for three-factor authentication.

The invention claimed is:

1. A computer implemented authentication method comprising:
   receiving a user's identification and password;
   generating a one time password;
   hashing a symmetric key;
   encrypting the one time password using symmetric key encryption employing the hashed symmetric key to provide an encrypted one time password;
   encoding the encrypted one time password in a two-dimensional barcode to provide a two-dimensional barcode of the encrypted one time password;
   transmitting the two-dimensional barcode of the encrypted one time password to a computing device of the user;
   reading the two-dimensional barcode of the encrypted one time password displayed on the user's computing device using a mobile device associated with the user to obtain the encrypted one time password;
   decrypting the encrypted one time password using the user's mobile device;
   displaying the one time password;

receiving the one time password spoken by the user; and
recognizing the user's voice and the one time password as spoken by the user to authenticate the user.

2. The computer implemented method of claim 1 wherein generating the one time password uses a hash based at least in part on at least one of an international mobile equipment identity (IMEI) of the user's mobile device and an international mobile subscriber identity (IMSI) of the user.

3. The computer implemented method of claim 1 wherein generating the one time password further comprises applying a hash chain of a hash function on concatenation of two or more of the user's identification, the user's password, and on at least one of an international mobile equipment identity (IMEI) of the user's mobile device and an international mobile subscriber identity (IMSI) of the user.

4. The computer implemented method of claim 1 wherein hashing a symmetric key further comprises hashing at least one of an international mobile equipment identity (IMEI) of the user's mobile device and an international mobile subscriber identity (IMSI) of the user.

5. The computer implemented method of claim 1, further comprising:
retrieving a number of times a one time password has been issued to the user; and
incrementing a counter of the number of times a one time password has been issued to the user upon transmitting the two-dimensional barcode of the encrypted one time password to a computing device of the user.

6. The computer implemented method of claim 5 wherein each of retrieving a number of times a one time password has been issued to the user and incrementing a counter of the number of times a one time password has been issued to the user are carried out by each of an authentication server and the user's mobile device.

7. The computer implemented authentication method of claim 1 wherein the one time password spoken by the user is spoken into a microphone of the user's computing device.

8. The computer implemented authentication method of claim 1 wherein receiving the user's identification and password, generating the one time password, encrypting the one time password, encoding the two-dimensional barcode, transmitting the two-dimensional barcode, receiving the one time password spoken by the user, and recognizing the user's voice and the one time password to authenticate the user are carried out by one or more authentication servers.

9. The computer implemented method of claim 1 wherein reading the two-dimensional barcode displayed on the user's computing device is carried out using a camera of the user's mobile device.

10. The computer implemented method of claim 1 wherein, following decryption of the encrypted one time password, the one time password is displayed by the user's mobile device.

11. A non-transitory, tangible computer program medium comprising computer program instructions executable by one or more processors of one or more computing devices, the computer program instructions, when implemented by the one or more processors, performing operations comprising:
receiving a username and password;
generating a one time password;
hashing a symmetric key;
encrypting the one time password using symmetric key encryption employing the hashed symmetric key to provide an encrypted one time password;
encoding the encrypted one time password in a two-dimensional barcode to provide a two-dimensional barcode of the encrypted one time password;
transmitting the two-dimensional barcode of the encrypted one time password to another computing device of the user;
reading the two-dimensional barcode of the encrypted one time password using a user's mobile computing device to obtain the encrypted one time password;
decrypting the encrypted one time password on the user's mobile computing device;
displaying the one time password on the user's mobile computing device;
receiving the one time password spoken by the user; and
recognizing the user's voice and the spoken one time password to authenticate the user.

12. The non-transitory, tangible computer program medium of claim 11 wherein generating the one time password uses a hash based at least in part on at least one of an international mobile equipment identity (IMEI) of the user's mobile device and an international mobile subscriber identity (IMSI) of the user.

13. The non-transitory, tangible computer program medium of claim 11 wherein generating the one time password further comprises applying a hash chain of a hash function on concatenation of two or more of the user's identification, the user's password, and on at least one of an international mobile equipment identity (IMEI) of the user's mobile device and an international mobile subscriber identity (IMSI) of the user.

14. The non-transitory, tangible computer program medium of claim 11 wherein hashing a symmetric key further comprises hashing at least one of an international mobile equipment identity (IMEI) of the user's mobile device and an international mobile subscriber identity (IMSI) of the user.

15. A system for authentication comprising:
one or more server computing devices, each comprising one or more respective processors operatively coupled to respective memory, each memory comprising computer program instructions executable by a processor to implement operations comprising:
receiving a username and password transmitted from a user mobile device;
generating a one time password;
hashing a symmetric key;
encrypting the one time password using symmetric key encryption and the hashed symmetric key to produce an encrypted one time password;
encoding the one time password in a two-dimensional barcode to produce a two-dimensional barcode of the encrypted one time password;
transmitting the two-dimensional barcode of the encrypted one time password to a user-computing device;
receiving the one time password spoken by the user; and
recognizing the user's voice and the one time password as spoken by the user to authenticate the user to access a site using at least one of the user computing device and the user mobile device;
the user computing device comprising one or more processors operatively coupled to memory comprising computer program instructions executable by the one or more processors to implement operations comprising:
receiving the two-dimensional barcode of the encrypted one time password;
displaying the two-dimensional barcode of the encrypted one time password;
recording the one time password spoken by the user;

transmitting the recording of the one time password to the one or more server computing devices; and the user mobile device comprising one or more processors operatively coupled to memory comprising computer program instructions executable by the one or more processors to implement operations comprising:

reading the two-dimensional barcode of the encrypted one time password displayed by the user computing device;

decrypting the encrypted one time password encoded in the two-dimensional bar code; and displaying the one time password on the user's mobile computing device.

16. The system of claim 15 wherein the one or more servers implement operations to use a hash based at least in part on at least one of an international mobile equipment identity (IMEI) of the user's mobile device and an international mobile subscriber identity (IMSI) of the user to generate the one time password, and the user's mobile device implements operations to use a hash based at least in part on the at least one IMEI and IMSI to decrypt the encrypted one time password.

17. The system of claim 15 wherein the one or more servers implement operations to apply a hash chain of a hash function on concatenation of two or more of the user's identification, the user's password, and at least one of an international mobile equipment identity (IMEI) of the user's mobile device and an international mobile subscriber identity (IMSI) of the user to generate the one time password.

18. The system of claim 15 wherein the one or more servers implement operations to apply a hash of at least one of an international mobile equipment identity (IMEI) of the user's mobile device and an international mobile subscriber identity (IMSI) of the user using a symmetric encryption algorithm to provide a hashed symmetric key, and the user's mobile device implements operations to apply the hash of the at least one IMEI of the user's mobile device and the IMSI of the user using the symmetric encryption algorithm to generate the hashed symmetric key to decrypt the encrypted one time password.

19. The system of claim 15 wherein at least one of the one or more server computing devices and the user's mobile device each implement operations to retrieve a number of times a one time password has been issued to the user, and increment a counter of the number of times a one time password has been issued to the user, upon transmission of the two-dimensional barcode of the encrypted one time password to the computing device of the user.

20. The system of claim 15 wherein the user's mobile device further comprises a camera, and wherein the computer program instructions of the user's mobile device are further used for reading the two-dimensional barcode of the encrypted one time password displayed by the user-computing device.

* * * * *